(12) United States Patent
Yamatani et al.

(10) Patent No.: US 10,857,960 B2
(45) Date of Patent: Dec. 8, 2020

(54) VEHICLE FRONT PORTION STRUCTURE

(71) Applicant: TOYOTA JIDOSHA KABUSHIKI KAISHA, Toyota (JP)

(72) Inventors: Mamiko Yamatani, Toyota (JP); Masatoshi Hata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 126 days.

(21) Appl. No.: 16/137,963

(22) Filed: Sep. 21, 2018

(65) Prior Publication Data

US 2019/0100161 A1    Apr. 4, 2019

(30) Foreign Application Priority Data

Oct. 3, 2017    (JP) .................. 2017-193862

(51) Int. Cl.
*B60R 19/18* (2006.01)
*B60R 19/04* (2006.01)
*B60R 19/24* (2006.01)
*B60R 19/12* (2006.01)
*B60R 21/00* (2006.01)

(52) U.S. Cl.
CPC .............. *B60R 19/18* (2013.01); *B60R 19/04* (2013.01); *B60R 19/12* (2013.01); *B60R 19/24* (2013.01); *B60R 2021/0046* (2013.01); *B60R 2021/0051* (2013.01); *B60R 2021/0053* (2013.01)

(58) Field of Classification Search
CPC ......... B60R 19/12; B60R 19/18; B60R 19/04; B60R 19/24; B60R 2021/0046; B60R 2021/0051; B60R 2021/0053

USPC ......................................................... 293/142
See application file for complete search history.

(56) References Cited

U.S. PATENT DOCUMENTS 7,226,097 B2 *   6/2007  Adachi .................. B60R 19/18
                                                    293/117
7,533,927 B2 *   5/2009  Ito ......................... B60R 19/18
                                                    293/120

FOREIGN PATENT DOCUMENTS

JP    2012-166766 A    9/2012
JP    2016-022805 A    2/2016

* cited by examiner

*Primary Examiner* — Joseph D. Pape
*Assistant Examiner* — Dana D Ivey
(74) *Attorney, Agent, or Firm* — Oliff PLC

(57) ABSTRACT

A vehicle front portion structure includes a lower absorber installed in a lower region of a vehicle front portion and having a longer length in a width direction of a vehicle, at least one load bearing member disposed on a rear side of the lower absorber and connected to the lower absorber so as to receive a load transferred from the lower absorber, in which at least a part of the lower absorber is equipped with a reinforcement member, and the reinforcement member is formed, in cross section, in a shape of substantially a wave composed of a series of upward protruding parts protruded upward of the vehicle and downward protruding parts protruded downward of the vehicle, the upward and downward protruding parts alternating along the width direction of the vehicle.

7 Claims, 4 Drawing Sheets

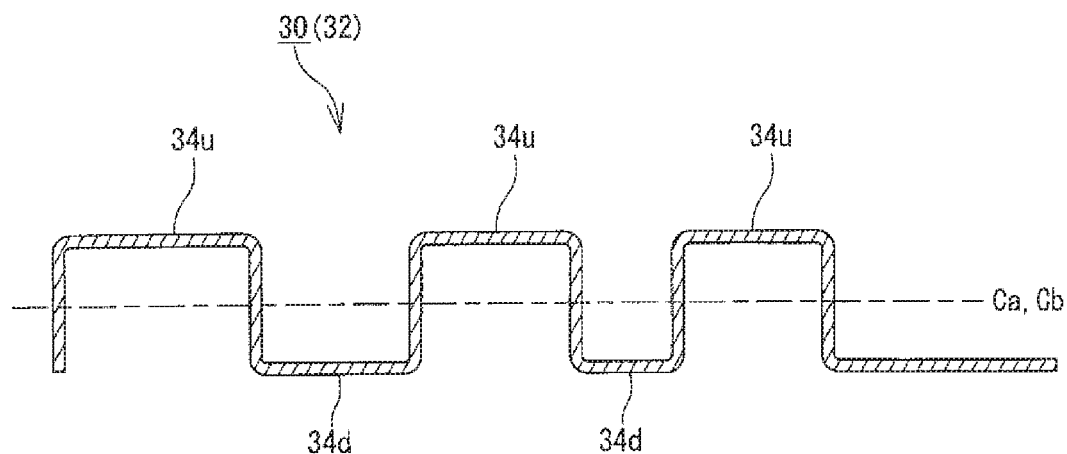
FIG. 5
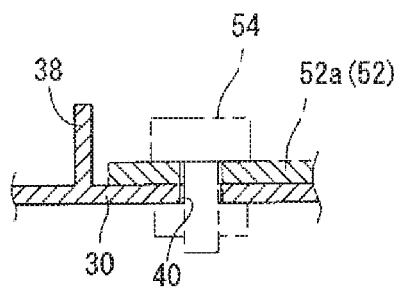
FIG. 6
FIG. 7

VEHICLE FRONT PORTION STRUCTURE

CROSS REFERENCE TO RELATED APPLICATION

The disclosure of Japanese Patent Application No. 2017-193862 filed on Oct. 3, 2017 including specification, claims, drawings and abstract is incorporated herein by reference in its entirety.

TECHNICAL FIELD

The present disclosure discloses a vehicle front portion structure including a lower absorber whose length is longer in a width direction of a vehicle; and one or more load bearing members for receiving a load from the lower absorber.

BACKGROUND

Conventionally, numerous techniques have been suggested for minimizing damage that is inflicted on a collision body (such as, for example, a foot of a pedestrian) when the collision body collides with a vehicle front portion. For example, JP 2016-022805 A discloses a bumper absorber installed on a vehicle front portion, in which the shape of beads in the bumper absorber is suitably designed for further ensuring that when receiving a collision impact, the bumper absorber is reliably crushed to absorb collision energy and therefore protect a pedestrian.

In addition to the technique of absorbing collision energy to protect a collision body, another technique has been recently suggested for protecting a collision body, in which the collision body is urged to fall on a hood or a roof of a vehicle, thereby preventing a joint (such as a knee) of the collision body from being hyperextended. Specifically, there have been several disclosures related to this technique, in which a lower absorber is installed below an upper absorber which absorbs collision energy from the collision body, and the lower absorber is configured to exert a reaction force that causes the collision body to be bouncingly lifted up and then fall on the hood or other portions of the vehicle.

CITATION LIST

Patent Literature

[Patent Document 1] JP 2016-022805 A

Here, the above-described lower absorber is required to promptly exert the reaction force immediately after colliding with the collision body. In a conventional vehicle, a design surface (a bumper cover) on a front end of the vehicle has been designed to be projected furthest outward in a horizontal direction at an installation height of the lower absorber for the purpose of prompt exertion of the reaction force. However, such a design of projecting the design surface furthest outward at the installation height of the lower absorber in the horizon direction is problematic in that a degree of flexibility in design is decreased at the front end of the vehicle.

In consideration of the above problem, the present disclosure discloses a vehicle front portion structure which can secure a function of protecting a collision body while improving a degree of flexibility in design of a vehicle front end.

SUMMARY

A vehicle front portion structure disclosed herein includes a lower absorber installed in a lower region of a vehicle front portion and having a longer length in a width direction of a vehicle, and one or more load bearing members disposed on a rear side of the lower absorber and connected to the lower absorber to receive a load transferred from the lower absorber. In the vehicle front portion structure, at least a part of the lower absorber is equipped with a reinforcement member which is formed, in cross section, in a shape of substantially a wave composed of a series of upward protruding parts protruded upward of the vehicle and downward protruding parts protruded downward of the vehicle, the upward protruding parts and the downward protruding parts alternating along the width direction of the vehicle.

Because the reinforcement member composed of the series of upward protruding parts and downward protruding parts alternating along the width direction of the vehicle is provided, when an impact force is applied from forward of the vehicle, the lower absorber having the reinforcement member is resistant to deflection along a back-and-forth direction of the vehicle, and therefore a collision load is promptly transferred from the lower absorber to the load bearing member located on the rear side of the lower absorber. Then, in this configuration, a reaction force against the collision load can start to act in an early stage even through a design surface of a vehicle front end is positioned further rearward at an installation height of the lower absorber than in the case of the conventional art. As a result of this, a degree of flexibility in design on the vehicle front end can be increased while the collision body can be suitably protected.

The lower absorber may be projected further outward in the width direction than the load bearing member, and the lower absorber may be connected to the load bearing member at a position located further outward than the load bearing member in the width direction.

In this configuration, it becomes possible to reliably or speedily transfer the collision load to the load bearing member even when the collision load is received at a position located further outward than the load bearing member in the width direction. Thus, in this way, it becomes possible to broaden a range on the vehicle where the collision body can be suitably protected.

In addition, the vehicle front portion structure may further include a bracket that is fastened to the load bearing member and also connected to the lower absorber, in which the lower absorber may include a contact wall that is erected so as to face a front end surface of the bracket.

In this configuration, even though connection of the lower absorber with the load bearing member is loosened upon receipt of the collision load, because the contact wall is brought into contact with the front end surface of the bracket, the collision load is transferred through the bracket to the load bearing member. This can further ensure reliable protection of the collision body.

Further, the upward protruding parts and the downward protruding parts constituting the reinforcement member may be extended substantially radially from a connection part of the lower absorber and the load bearing member toward a front end of the lower absorber.

The above-described configuration can facilitate transfer of the collision load received at the front end of the lower absorber through the upward protruding parts or the downward protruding parts to the connection part and thus to the load bearing member. As a result, it can be further ensured that the collision body is protected with reliability.

The lower absorber may include a center lower absorber and a pair of edge lower absorbers disposed on both sides of the center lower absorber in the width direction, and the center absorber may have a flat top surface.

In this configuration, because a surface (the top surface of the center lower absorber) which is visually recognizable from interstices of a front grille gives an impression that it is plain and tidy, design of the vehicle can be improved.

Further, the lower absorber may include a center lower absorber and a pair of edge lower absorbers disposed on both sides of the center lower absorber in the width direction, while the load bearing member includes a center load bearing member located on a rear side of the center lower absorber and connected thereto and a pair of edge load bearing members respectively located on rear sides of the edge lower absorbers and respectively connected thereto, in which the edge lower absorbers may be projected further outward in the width direction than the edge load bearing members, and may be equipped entirely with the reinforcement member.

Because the reinforcement member is mounted on the edge lower absorbers projected further outward than the edge load bearing members, the edge lower absorbers can, in addition to the center lower absorber, speedily exert the reaction force, which can contribute to broadening of the range on the vehicle where the collision body can be suitably protected.

Still further, the design surface of the vehicle front end at an installation height of the lower absorber may be retreated rearward of the vehicle from the outermost projecting region of the design surface that is projected furthest outward in a horizontal direction.

Because there has been no implementation example of such a form of design which is difficult to implement in the prior art, the above-described form of design makes a novel impression on a user.

According to the vehicle front portion structure disclosed herein, because the lower absorber is equipped with the reinforcement member composed of the series of upward protruding parts and downward protruding parts which are alternated along the width direction of the vehicle, the lower absorber is resistant to deflection along the back-and-forth direction of the vehicle when receiving an impact force from forward of the vehicle, which allows the lower absorber to promptly transfer the collision load to the load bearing member on the rear side of the lower absorber. Then, in this way, even though the design surface of the vehicle front end at the installation height of the lower absorber is on the position shifted rearward from that of conventional art, the reaction force against the collision load can be speedily started to act in the early stage. As a result of this, the collision body can be suitably protected while securing an improved degree of flexibility in design of the vehicle front end.

BRIEF DESCRIPTION OF DRAWINGS

An embodiment of the present disclosure will be described based on the following figures, wherein:

FIG. 5 is a section view taken along a line B-B indicated in FIG. 4;

FIG. 6 is a section view taken along a line C-C indicated in FIG. 4;

FIG. 7 is a diagram showing start-up timing of exertion of a reaction force from the edge lower absorber.

DESCRIPTION OF EMBODIMENTS

Figure 1:
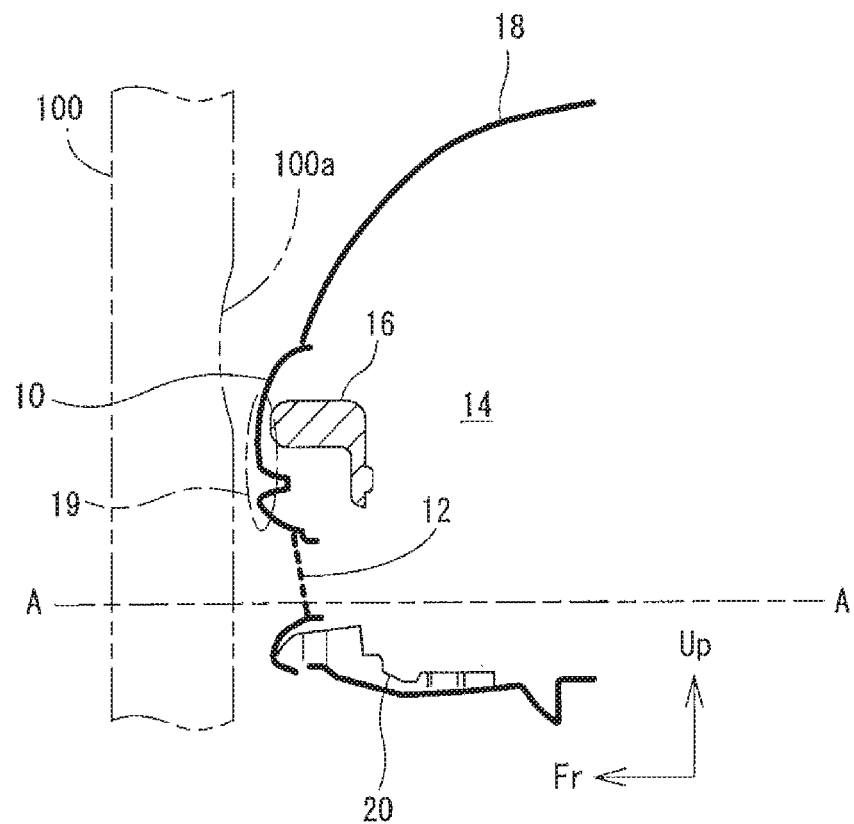
FIG. 1 is an overview of a longitudinal section of a vehicle front portion structure.
Figure 2:
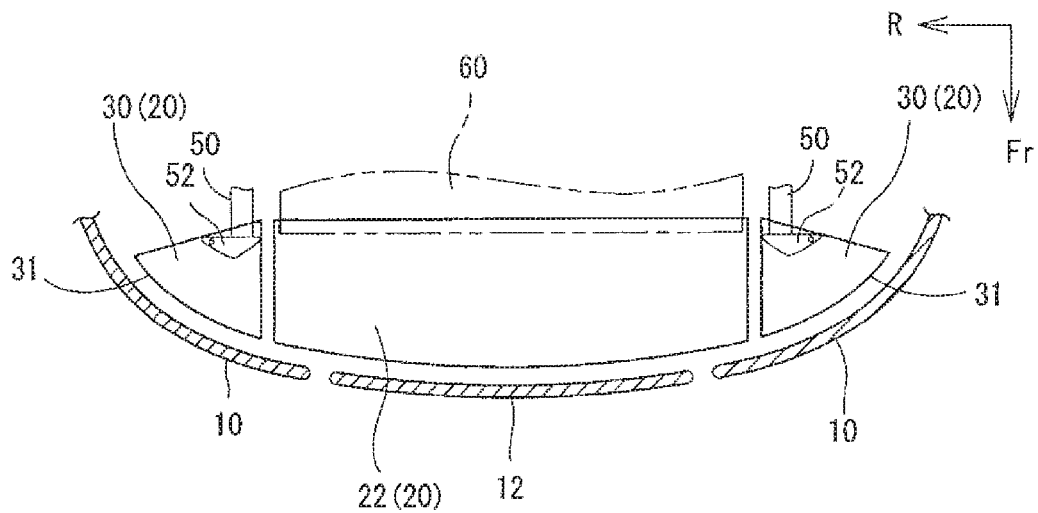
FIG. 2 is an overview of a lateral section at a height position A indicated in FIG. 1.

A vehicle front portion structure will be described below with reference to the drawings. FIG. 1 is an overview of a longitudinal section of the vehicle front portion structure, and FIG. 2 is an overview of a lateral section of the vehicle front portion structure at a height position A indicated in FIG. 1. It should be noted that FIGS. 1 and 2 only show components which are particularly associated with a lower absorber 20.

As shown in FIG. 1, a front end of a vehicle is covered with a bumper cover 10. The bumper cover 10 constitutes a design surface of a vehicle front portion. A space behind the bumper cover 10 is used as a power unit chamber 14 for housing power units (such as, for example, an engine, a motor, and a drive battery) that generate power for vehicle travel. Further, the bumper cover 10 incorporates a front grille 12 through which air is introduced from outside of the vehicle into the power unit chamber 14. The front grille 12 is, as has been well known, a long component extending along a vehicle width direction, and has a plurality of through holes.

Behind the bumper cover 10; i.e., inside the power unit chamber 14, an upper absorber 16 and a lower absorber 20 are installed. The upper absorber 16 is a long component extending along the vehicle width direction and arranged in a region above the front grille 12. When a collision body 100 (such as, for example, a foot of a pedestrian) collides against a vehicle front end, the upper absorber 16 is compressively deformed along a direction of absorbing a collision load (typically, toward a rear side of the vehicle), to thereby absorb the collision load. In this way, the upper absorber 16 functions to protect the collision body 100. In view of suitable protection of the collision body 100, it is preferable that the upper absorber 16 should make contact with the collision body 100 at the earliest possible timing. To achieve this, the design surface of the vehicle front end (the bumper cover 10) has an outermost projecting region 19 which is projected most outward in the horizontal direction at an installation height of the upper absorber 16.

The lower absorber 20 is disposed below the upper absorber 16 and also below the front grille 12. The lower absorber 20 is composed of, for example, a resin or the like and is configured to exert, on the collision body 100, a reaction force against a collision force when colliding with the collision body 100, and causes the collision body 100 to be bounced forward. This allows the collision body 100 to easily fall to a vehicle side (such as, for example, on a hood 18). Then, this action of falling to the vehicle side prevents a joint 100a of the collision body 100 (such as a knee of a foot of a pedestrian) from being hyperextended, and lightens a load received by the collision body 100.

The lower absorber 20 is a long component extending along the vehicle width direction. In the vehicle front portion structure disclosed herein, the lower absorber 20 is divided, as shown in FIG. 2, into parts of a center lower absorber 22 and a pair of edge lower absorbers 30 disposed on both width ends of the center lower absorber 22. However, as a matter of course, the lower absorber 20 may be composed of a single component.

The center lower absorber 22 is a long, and substantially rectangular component extending along the vehicle width direction. The center lower absorber 22 is flat on its top surface, while a plurality of ribs (not illustrated) are formed on the rear surface of the center lower absorber 22. The reason of making the top surface flat is to improve the design which is viewed from interstices in the front grille 12. Specifically, because the front grille 12 is located above the center lower absorber 22, the top surface of the center lower absorber 22 is visually recognized through the interstices of the front grille 12. When the top surface visually recognizable through the interstices of the front grille 12 is flat, it gives the impression of being neat, and contributes to superior design. With this in view, the top surface of the center lower absorber 22 is flattened. In addition, the plurality of ribs formed on the rear surface of the center lower absorber 22 make the center lower absorber 22 resistant to deflection, which allows the center lower absorber 22 to speedily and reliably transfer the collision load input from the collision body 100 to a radiator support 60 on the rear side of the center lower absorber 22.

The radiator support 60 is a highly rigid component, and functions as a center load bearing member for receiving the collision load transferred from the center lower absorber 22. The radiator support 60 is disposed on the rear side of the center lower absorber 22, and connected to a rear end of the center lower absorber 22. When the collision load is input through the center lower absorber 22 to the radiator support 60, the radiator support exerts a reaction force without being deformed. The reaction force acting on the collision body 100 through the center lower absorber 22 causes the collision body 100 to be bounced up, which facilitates falling of the collision body 100 on the vehicle side. The center lower absorber 22 has a width which is almost equal to that of the radiator support 60, so that the entire width of the center lower absorber 22 is supported by the radiator support 60.

The edge lower absorbers 30 are disposed on both sides of the center lower absorber 22 in the width direction. Each of the edge lower absorbers 30 has a substantially arc shaped front end side 31, and is formed in a substantially fan shape as viewed from above. As the front end surface of the vehicle is gradually rounded in a top plan view, the front end side 31 has a geometry conforming to the rounded front end surface of the vehicle.

A second member 50 of a highly rigid component is installed on a rear side of each of the edge lower absorbers 30, and the rear end of each of the edge lower absorbers 30 is connected through a bracket 52 to the second member 50. The second member 50, which is a component connected to a suspension member (not illustrated) located rearward of the second member 50, functions as an edge load bearing member for receiving the collision load transferred from the edge lower absorber 30. When the collision load is input through one of the edge lower absorbers 30 to the corresponding one of the second members 50, the one of the second members 50 exerts a reaction force without being defaulted. The reaction force acting on the collision body 100 through the edge lower absorber 30 causes the collision body 100 to be bounced up, which facilitates falling of the collision body 100 on the vehicle side.

It should be noted that the edge lower absorbers 30 are located on the outside of the front grille 12 in the width direction. Further, the edge lower absorbers 30 are, as shown in FIG. 2, extended further outward than the second members 50 (the edge load bearing members).

Here, to reliably protect the collision body 100 by the lower absorber 20, it is desired that the reaction force against the collision load should start acting at an early stage. For this reason, the design surface (the bumper cover 10) of the vehicle front end has been conventionally projected most outwardly in the horizontal direction not only at the installation height of the upper absorber 16 but also at the installation height of the lower absorber 20, to thereby speedily transfer the collision load from the collision body 100 to the lower absorber 20. In such a form, the collision body 100 is immediately caused to collide with the lower absorber 20, which, in turn, causes the reaction force to start to act in the early stage. However, this form inevitably includes a region projected forward in a lower part of the vehicle front end (at the installation height of the lower absorber 20), and thus has a lower degree of flexibility in design.

Under the circumstances, in the vehicle front portion structure disclosed herein, the design surface (the bumper cover 10) of the vehicle front end is slightly retreated rearward from the outermost projecting region 19 at the installation height of the lower absorber 20, and a reinforcement member 32 which is resistant to deformation is provided to a part of the lower absorber 20 (more specifically, the edge lower absorber 30). Because the reinforcement member 32 resistant to deformation is provided to the part of the lower absorber 20, even though the lower absorber 20 is installed on a position retreated rearward of the vehicle from that in prior art, the reaction force can be started to act in the early stage, to thereby suitably protect the collision body 100.

Figure 3:
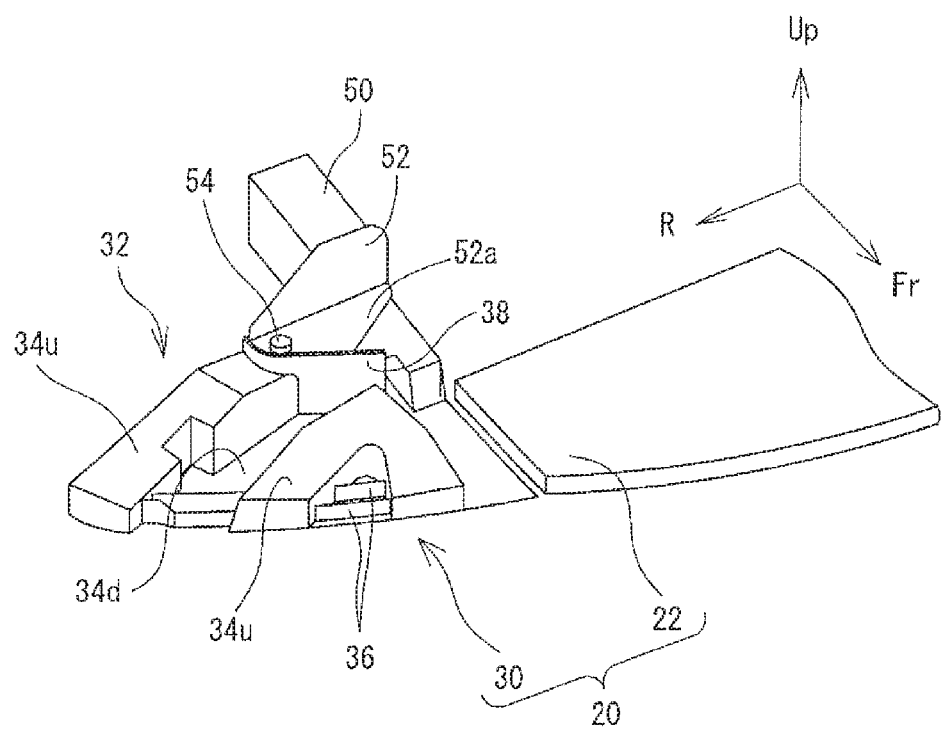
FIG. 3 is a perspective view showing an edge lower absorber and its adjacent areas.
Figure 4:
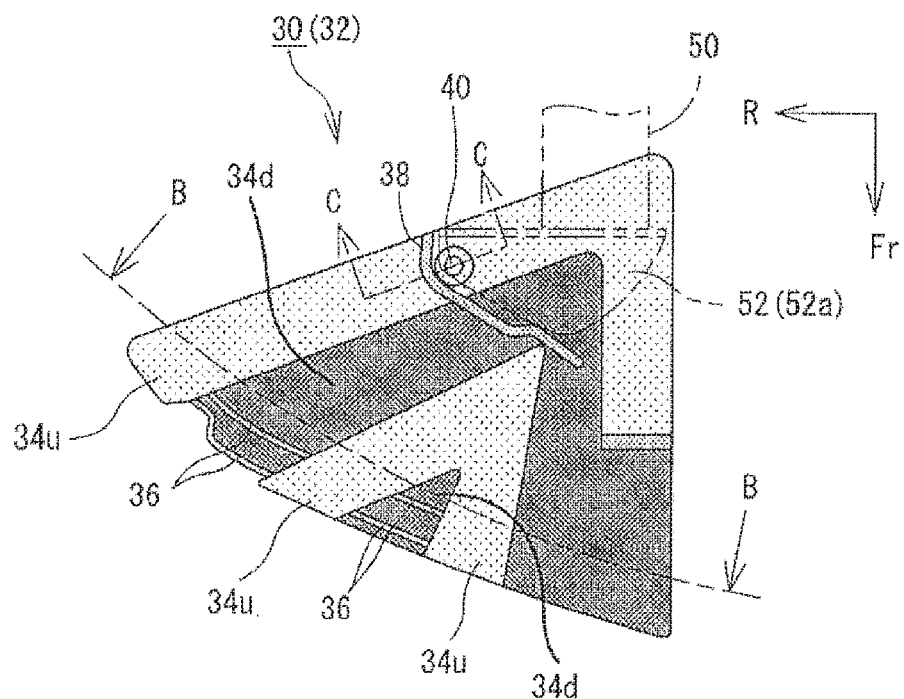
FIG. 4 is a plan view of the edge lower absorber.

Specifically, in this example, the reinforcement member 32 is provided to the edge lower absorber 30. This will be explained in detail with reference to FIGS. 3 to 6 below. FIG. 3 is a perspective view showing the edge lower absorber 30 and its adjacent areas, and FIG. 4 is a plan view of the edge lower absorber 30. Further, FIG. 5 schematically shows a cross section view taken along a line B-B indicated in FIG. 4, and FIG. 6 schematically shows a cross section view taken along a line C-C indicated in FIG. 5. It should be noted that, in FIG. 4, upward protruding parts 34*u* are light shaded, downward protruding parts 34*d* are dark shaded, and the other areas are shaded in an intermediate tone.

The edge lower absorber 30 has, as described above, the substantially fan shape with the front end side 31 being an arc-shaped contour that conforms to the shape of the vehicle front end as viewed from above. The entire edge lower absorber 30 is a site where projections and depressions for preventing deformation are formed; i.e. functions as the reinforcement member 32.

More specifically, as shown in FIG. 5, the edge lower absorber 30 is formed, in cross section, in a shape of a substantially rectangular wave composed of a series of upward protruding parts 34*u* of a substantially rectangular form protruded upward of the vehicle and downward protruding parts 34*d* of a substantially rectangular form protruded downward of the vehicle, the upward and downward protruding parts 34*u* and 34*d* alternating along substantially a vehicle width direction (more specifically, a direction in parallel to the round shape of the vehicle front end). The thus-formed shape makes the edge lower absorber 30 resistant to deformation, which enables the reaction force against the collision load to start to act in the early stage.

Figure 8:
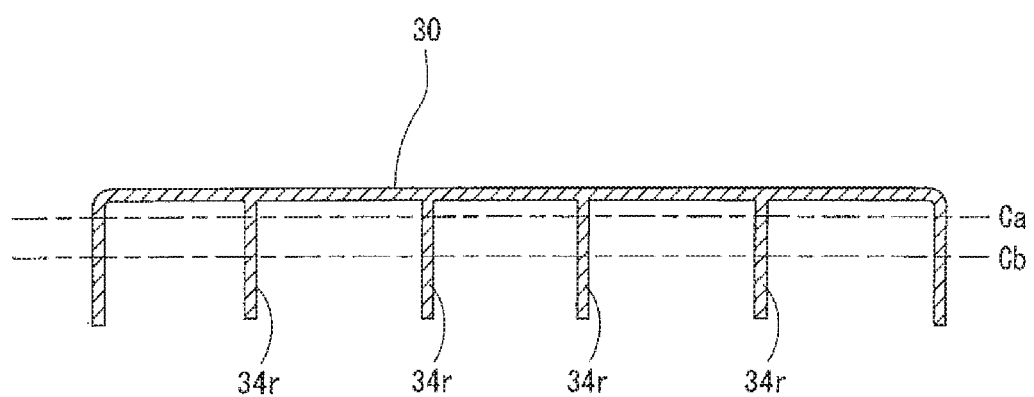
FIG. 8 is a diagram showing an example of a cross sectional shape of a conventional edge lower absorber.

Here, if it is only intended to reinforce the edge lower absorber 30, the edge lower absorber 30 may be formed in a shape having multiple ribs 34*r* which are protruded as shown in FIG. 8 along only one direction, rather than having the cross sectional shape shown in FIG. 5. The above described center lower absorber 22 has a geometry close to the geometry shown in FIG. 8. However, in this geometry, a centroid Ca of the edge lower absorber 30 is greatly offset from the center Cb of the height of the edge lower absorber 30. In this case, the collision load tends to escape along a direction approaching the centroid Ca of the edge lower absorber 30; i.e., along an upward direction. Further, in this case, because a stress can often occur due to a difference in stiffness between upper and lower regions of the edge lower absorber 30, the edge lower absorber 30 is easily deformed along the back-and-forth direction. As a result, transfer of the collision load to the second member 50 located rearward is impaired, which causes a problem in that start-up of exertion of the reaction force against the collision load is delayed, and thus protection of the collision body 100 is delayed.

The problem is particularly detrimental to the edge lower absorber 30 which is projected further outward in the vehicle width direction than the load bearing member (such as the radiator support 60 and the second member 50). More specifically, because the edge lower absorber 30 includes a region which is not supported from behind by the load bearing member, the edge lower absorber 30 is more vulnerable to impairment of the capability to transfer the collision load to the load bearing member, than the center lower absorber 22 is.

To avoid the problem in the vehicle front portion structure disclosed herein, the entire edge lower absorber 30 is configured to be the reinforcement member 32 which has a cross sectional shape of a substantially rectangular wave. As shown in FIG. 5, when the edge lower absorber 30 is formed in the cross sectional shape of the substantially rectangular wave, the centroid Ca of the edge lower absorber 30 approximately coincides with the center Cb of the height of the edge lower absorber 30, and an input point (the center Cb) of load is located almost at the same height as that of the centroid Ca. This prevents the collision load from escaping along the vertical direction. Further, because degrees of stiffness of upper and lower regions of the edge lower absorber 30 are almost evened up, the edge lower absorber 30 becomes resistant to deflection along the back-and-forth direction. As a result, transfer of the collision load to the second member 50 located rearward of the edge lower absorber 30 can be facilitated, to thereby enable the reaction force against the collision load to start to act in the early stage, which can contribute to further suitable protection of the collision body 100.

Meanwhile, the reinforcement member 32 may include, in addition to the above-described upward protruding parts 34u and the rearward protruding parts 34d, the ribs 36 extending along the width direction. The inclusion of the ribs 36 provides resistance to both deflection along the back-and-forth direction and deflection along the width direction, and therefore ensures that the collision load is reliably transferred to the second member 50.

The edge lower absorber 30 is joined to the second member 50 via the bracket 52. The bracket 52 is a substantially L shaped sheet metal component fastened to the front end surface of the second member 50. A horizontally extending surface (hereinafter referred to as a "fastening surface 52a") of the bracket 52 has a fastening hole into which a fastening bolt 54 is inserted. Here, as can be seen from FIGS. 3 and 4, the fastening surface 52a is projected, in the width direction, further outward than the second member 50, and the fastening hole is located further outward than the second member 50 in the width direction.

The edge lower absorber 30 also has a fastening hole 40 into which the fastening bolt 54 is inserted. The fastening hole 40 is located further outward than the second member 50 in the width direction. Then, the edge lower absorber 30 and the bracket 52 are screw fastened to each other by the fastening bolt 54 inserted into the fastening holes of both the edger lower absorber 30 and the bracket 52. Here, as described above, because the fastening hole 40 is located further outward than the second member 50, the second member 50 is connected to the edge lower absorber 30 at a position located outside of the second member 50 in the width direction. In this arrangement, even when the collision body 100 collides with the vehicle at the position located outside of the second member 50 (the load bearing member) in the width direction, the collision force from the collision body 100 can be transferred to the second member 50, which can cause the reaction force to act on the collision body 100, and can, in turn, further reliably protect the collision body 100.

In addition, as shown in FIGS. 4 and 6, a contact wall 38 is arranged to stand on the top surface of the edge lower absorber 30 at a position located slightly more forward than the fastening hole 40 on the top surface. The contact wall 38 is a wall which is arranged closely adjacent to the front end side of the fastening surface 52a of the bracket 52 and directly opposed to the front end side. When the contact wall 38 is arranged, a part (the contact wall 38) of the edge lower absorber 30 can make contact with the bracket 52 even in the event that the fastening bolt 54 is loosened in response to receipt of the collision load. Then, even though the connection through the fastening bolt 54 is loosened, the collision load received by the edge lower absorber 30 can be reliably transferred through the bracket 52 to the second member 50. In this way, the reaction force can be exerted with reliability, to suitably protect the collision body 100.

Here, the edge lower absorber 30 includes, as described above, the upward protruding parts 34u and the downward protruding parts 34d constituting the reinforcement member 32. The upward protruding parts 34u and the downward protruding parts 34d are extended substantially radially as shown in FIG. 4 from a connection site with the second member 50 (a region contacting the bracket 52). In this way, the collision load received at any position on the front end side 31 can be easily directed toward the connection site, and thus toward the bracket 52 and the second member 50, which means that the collision load can be further reliably transferred to the second member 50.

FIG. 7 is a diagram representing a result of analyzing a time at which the reaction force of the edge lower absorber 30 starts to act. In FIG. 7, the X axis represents time and the Y axis represents magnitude of the reaction force. Further, in FIG. 7, the solid line shows the reaction force exerted by the edge lower absorber 30 having the structure disclosed herein, while the broken line shows the reaction force exerted by an edge lower absorber 30 which is of a conventional structure in which the ribs 34r are arranged as shown in FIG. 8 only on one side of the edge lower absorber 30.

As is evident from FIG. 7, it is understood that, in the edge lower absorber 30 disclosed herein, the reaction force starts to act in an earlier stage as compared with the conventional structure. Further, according to the lower absorber 30 disclosed herein, the peak value of the reaction force is increased by approximately 30% from that of the conventional structure, which indicates that the collision load is transferred to the second member 50 without escaping upward or downward. As a result, because the reaction force can start to act in the early stage even through the design surface is moved rearward from a conventional position at the installation height of the lower absorber 20, it becomes possible to suitably protect the collision body 100 while maintaining the higher degree of flexibility in design.

Although in the above description only the edge lower absorber 30 is equipped with the reinforcement member 32 (the part having the cross sectional shape of the substantially rectangular wave), the reinforcement member 32 may be provided to the whole or a part of the center lower absorber 22 in addition to or in lieu of the edge lower absorber 30. However, as distinct from the center lower absorber 22, the edge lower absorber 30 is projected further outward from the second member 50 (the edge load bearing member) in the width direction as described above. Since the thus projected edge lower absorber 30 can have difficulty in transferring the collision load to the second member 50 when the reinforcement member 32 is absent, it is desirable that the edge lower absorber 30 should be equipped with the reinforcement member 32.

Meanwhile, because the front grille 12 is arranged above the center lower absorber 22, the top surface of the center lower absorber 22 is visually recognizable from the interstices of the front grille 12 in many cases. In these cases, it is preferable that the center lower absorber 22 have a flat top surface without including the reinforcement member 32. In this configuration, the design of the center lower absorber 22 viewable through the interstices of the front grille 12 can be improved.

In addition, although the reinforcement member 32 has been described as having the cross sectional shape of the substantially rectangular wave, the reinforcement member 32 may have another shape, so long as upwardly protruding geometries and downwardly protruding geometries are continuously alternated to form a cross sectional shape of a substantially wave in such a manner that the centroid of the shape is located closer to the height center of the shape. For example, the reinforcement member 32 may be formed, in cross section, in a shape of a substantially sinusoidal wave (a wave shape) composed of a series of upwardly curved arcs and downwardly curved arcs continuing along the width direction. Further, as another form, the reinforcement member 32 may be in a shape of a substantially triangular wave composed of a series of upward crests and downward crests continuing in the width direction. Still further, in the present disclosure, the widths and a continuing direction of the upward protruding parts 34u and the downward protruding parts 34d may be changed as appropriate, and the upward protruding parts 34u and the downward protruding parts 34d may be continued in parallel with a rear side of the vehicle.

REFERENCE SIGNS LIST 10 bumper cover, 12 front grille, 14 power unit chamber, 16 upper absorber, 18 hood, 19 outermost projecting region, 20 lower absorber, 22 center lower absorber, 30 edge lower absorber, 32 reinforcement member, 34d downward protruding part, 34u upward protruding part, 36 rib, 38 contact wall, 40 fastening hole, 50 second member (edge load bearing member), 52 bracket, 54 fastening bolt, 60 radiator support (center load bearing member), 100 collision body.

The invention claimed is:

1. A vehicle front portion structure, comprising:
a lower absorber that is installed in a lower region of a vehicle front portion, and has a longer length in a width direction of a vehicle; and
at least one load bearing member that is disposed on a rear side of the lower absorber, and connected to the lower absorber so as to receive a load transferred from the lower absorber, wherein
at least a part of the lower absorber is equipped with a reinforcement member, and
the reinforcement member is formed, in cross section, in a shape of substantially a wave composed of a series of upward protruding parts protruded upward with respect to the vehicle and downward protruding parts protruded downward with respect to the vehicle, the upward protruding parts and the downward protruding parts ha alternating along the width direction of the vehicle.

2. The vehicle front portion structure according to claim 1, wherein:
the lower absorber is projected further outward in the width direction than the load bearing member, and
the lower absorber is connected to the load bearing member at a position located further outward than the load bearing member in the width direction.

3. The vehicle front portion structure according to claim 1, further comprising:
a bracket that is fastened to the load bearing member and connected to the lower absorber, wherein
the lower absorber includes a contact wall that is erected so as to face a front end surface of the bracket.

4. The vehicle front portion structure according to claim 1, wherein
the upward protruding parts and the downward protruding parts constituting the reinforcement member are extended substantially radially from a connection part of the lower absorber and the load bearing member toward a front end of the lower absorber.

5. The vehicle front portion structure according to claim 1, wherein
the lower absorber comprises a center lower absorber and a pair of edge lower absorbers disposed on both sides of the center lower absorber in the width direction, and
a top surface of the center lower absorber is flat.

6. The vehicle front portion structure according to claim 1, wherein:
the lower absorber comprises a center lower absorber and a pair of edge lower absorbers disposed on both sides of the center lower absorber in the width direction;
the load bearing member comprises a center load bearing member that is located on a rear side of the center lower absorber and connected to the center lower absorber, and a pair of edge load bearing members that are respectively located on rear sides of the pair of the edge lower absorbers and respectively connected to the edge lower absorbers; and
the edge lower absorbers are projected further outward than the edge load bearing members in the width direction, and equipped entirely with the reinforcement member.

7. The vehicle front portion structure according to claim 1, wherein a design surface of a vehicle front end at an installation height of the lower absorber is retreated rearward of the vehicle from an outermost projecting region of the design surface that is projected most outward in a horizontal direction.

* * * * *